(12) United States Patent
Byun et al.

(10) Patent No.: US 11,265,848 B2
(45) Date of Patent: Mar. 1, 2022

(54) METHOD AND DEVICE FOR TRANSMITTING GRANT-FREE-BASED UPLINK DATA IN WIRELESS COMMUNICATION SYSTEM

(71) Applicant: LG Electronics Inc., Seoul (KR)

(72) Inventors: Ilmu Byun, Seoul (KR); Yunjung Yi, Seoul (KR); Daesung Hwang, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 16/478,584

(22) PCT Filed: Jan. 30, 2018

(86) PCT No.: PCT/KR2018/001261
§ 371 (c)(1),
(2) Date: Oct. 28, 2019

(87) PCT Pub. No.: WO2018/143637
PCT Pub. Date: Aug. 9, 2018

(65) Prior Publication Data
US 2020/0154400 A1    May 14, 2020

Related U.S. Application Data

(60) Provisional application No. 62/454,058, filed on Feb. 3, 2017.

(51) Int. Cl.
*H04W 72/04*    (2009.01)
*H04L 5/00*    (2006.01)
*H04W 72/14*    (2009.01)

(52) U.S. Cl.
CPC .......... *H04W 72/04* (2013.01); *H04L 5/0048* (2013.01); *H04W 72/14* (2013.01)

(58) Field of Classification Search
CPC ...... H04W 72/04; H04W 72/14; H04L 5/0048
(Continued)

(56) References Cited

U.S. PATENT DOCUMENTS

2013/0163536 A1\* 6/2013 Anderson ............. H04L 5/0037
370/329
2014/0254544 A1    9/2014 Kar Kin Au et al.
(Continued)

FOREIGN PATENT DOCUMENTS

| CN | 102612852 A | 7/2012 |
| JP | 2016514416 A | 5/2016 |
| WO | 2017191833 A1 | 11/2017 |

OTHER PUBLICATIONS

ZTE, "Discussion on Grant-free Transmission for URLLC," R1-1611296, 3GPP TSG RAN WG1 Meeting #87, Reno, USA, Nov. 6, 2016, see sections 1-4.
(Continued)

*Primary Examiner* — Christopher R Crompton
(74) *Attorney, Agent, or Firm* — Dentons US LLP

(57) ABSTRACT

A method and a device for transmitting an uplink transmission block in a wireless communication system are provided. Particularly, a terminal receives, from a base station, allocation information on a first grant-free uplink resource, which is scheduled semi-persistently. The terminal repeatedly transmits a first transmission block through the first grant-free uplink resource by using a first reference signal. The terminal transmits a second transmission block by using a second reference signal before completion of the transmission of the first transmission block. The second transmission block is distinguished from the first transmission block through a change of the first reference signal to the second reference signal.

20 Claims, 10 Drawing Sheets

(58) Field of Classification Search
USPC .......................................................... 370/329
See application file for complete search history.

(56) References Cited

U.S. PATENT DOCUMENTS

| 2016/0150525 | A1 | 5/2016 | Xu et al. | |
|---|---|---|---|---|
| 2018/0176945 | A1* | 6/2018 | Cao | H04L 5/0044 |
| 2018/0206246 | A1* | 7/2018 | Zhang | H04W 72/085 |

OTHER PUBLICATIONS

Ericsson, "On Reference Signal Design for Grant-free Access," R1-1612956, 3GPP TSG RAN WG1 Meeting #87, Reno, USA, Nov. 4, 2016, see section 3.

Fujitsu, "Discussion on Grant-free for UL URLLC," R1-1611464, 3GPP TSG RAN WG1 Meeting #87, Reno, USA, Nov. 4, 2016, see section 2.

Samsung, "Collision Analysis of Grant-free Based Multipleaccess," R1-1612573, 3GPP TSG RAN WG1 Meeting #87, Reno, USA, Nov. 4, 2016, see sections 2-3.

Ericsson, "Framework for grant-free acess for URLLC", 3GPP TSG RAN WG1 AH_NR Meeting, Jan. 16-20, 2017, R1-1700689.

Lenovo, "Discussion on retransmission design for grant-free based UL transmission", 3GPP TSG RAN WG1 Meeting #86bis, Oct. 10-14, 2016, R1-1609400.

Huawei, HiSilicon, "Support of URLLC in UL", 3GPP TSG RAN WG1 NR Ad Hoc Meeting, Jan. 16-20, 2017, R1-1700024.

CATT, "UL grant-free transmission for URLLC", 3GPP TSG RAN WG1 AH_NR Meeting, Jan. 16-20, 2017, R1-1700206.

Intel Corporation, "Uplink URLLC Transmission without Grant", 3GPP TSG RAN WG1 NR Ad-Hoc Meeting, Jan. 16-20, 2017, R1-1700375.

Guangdong OPPO Mobile Telecom, "Uplink grant-less transmission for URLLC", 3GPP TSG RAN WG1 NR-Adhoc, Jan. 16-20, 2017, R1-1700571.

Samsung, "Grant-free based multiple access", 3GPP TSG RAN WG1 NR Ad Hoc, Jan. 16-20, 2017, R1-1701003.

ZTE, ZTE Microelectronics, NTT DoCoMo, Huawai, HiSilicon, Intel, CATT, Nokia, ASB, Sony, CEWiT, IITM, Tejas Networks, Interdigital, "WF on retransmission for UL URLLC", 3GPP TSG RAN WG1 AH_NR Meeting, Jan. 16-20, 2017, R1-1701505.

* cited by examiner

METHOD AND DEVICE FOR TRANSMITTING GRANT-FREE-BASED UPLINK DATA IN WIRELESS COMMUNICATION SYSTEM

BACKGROUND OF THE INVENTION

Field of the Invention

This specification is related to wireless communication and, most particularly, to a method and apparatus for transmitting grant-free based uplink data in a wireless communication system.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a mobile communication system, data is transmitted/received through a resource allocation process based on BS scheduling to maximize resource utilization, which may lead to an increase in latency of uplink data transmission of a UE. Accordingly, a method of performing a multi-level scheduling request is proposed to minimize the latency of the UE.

SUMMARY OF THE INVENTION

Technical Objects

This specification provides a method and apparatus for transmitting grant-free based uplink data in a wireless communication system.

Technical Solutions

This specification proposes a method and apparatus for transmitting grant-free based uplink data in a wireless communication system.

The apparatus (or device) includes a radio frequency (RF) unit transmitting and receiving radio signals, and a processor being operatively connected to the RF unit.

The present embodiment assumes that a terminal repeatedly transmits an uplink transport block through a pre-scheduled grant-free UL resource. In this case, in order to combine and decode the repeatedly transmitted transport blocks, a base station needs to know a first transmission point of the transport block. The present embodiment includes various embodiments in which the terminal informs the base station of the first transmission point of the transport block.

Grant-free UL transmission may correspond to a scheme in which uplink data is transmitted without an uplink grant. Therefore, there is an advantage in that data can be transmitted faster than the uplink transmission scheme based on the uplink grant. In addition, a grant-free UL resource is a resource common to the terminal, and collision may occur since different terminals transmit signals simultaneously on the same resource. However, a case where one terminal transmits a signal is assumed in the present embodiment.

First, the terminal receives allocation information on a first grant-free uplink resource which is scheduled semi-statically from a base station. In this case, it may be assumed that one grant-free uplink resource is allocated to the terminal.

The terminal repeatedly transmits a first transport block through the first grant-free uplink resource by using/based on a first reference signal.

The terminal transmits a second transport block by using/based on a second reference signal before the transmission of the first transport block is complete. Since the terminal may transmit the second transport block before transmission of the first transport block is complete, the terminal may transmit the second transport block even at a time of waiting for reception of a response signal (ACK/NACK signal) in response to the first transport block by repeatedly transmitting the first transport block. In this case, the first reference signal and the second reference signal may correspond to a demodulation reference signal (DMRS).

The second transport block may be transmitted through the first grant-free uplink resource. A sequence of the second reference signal may be different from a sequence of the first reference signal. Therefore, the second transport block may be distinct from the first transport block based on a change of the first reference signal to the second reference signal. That is, in order to inform the base station of the fact that the second transport block different from the first transport block is transmitted, the terminal may change the first reference signal (a sequence of the first reference signal) to the second reference signal (a sequence of the second reference signal) within the first grant-free uplink resource.

In addition, the first transport block may be no longer transmitted or be transmitted simultaneously with the second transport block when the second transport block is transmitted. The first transport block and the second transport block may be transmitted simultaneously through the same resource since different reference signals are used.

In addition, the terminal may receive allocation information on the first reference signal and allocation information on the second reference signal from the base station. The allocation information on the first reference signal and the allocation information on the second reference signal may be received through radio resource control (RRC) signaling. The allocation information may include a rule regarding how a reference signal changes when a new transport block is transmitted.

In addition, the terminal may receive allocation information on a second grant-free uplink resource which is scheduled semi-statically from the base station. In this case, it may assumed that a plurality of grant-free uplink resources are allocated to the terminal.

Allocation information on the first grant-free uplink resource and allocation information on the second grant-free uplink resource may be received through RRC signaling.

Each of the first grant-free uplink resource and the second grant-free uplink resource may be periodically allocated and be frequency hopped. A start point of a period of the first grant-free uplink resource and a start point of a period of the second grant-free uplink resource may be different from each other. In this case, the second transport block may be transmitted through the second grant-free uplink resource by using/based on the second reference signal.

For another example, the terminal may additionally transmit a scheduling request or a preamble when the second transport block is transmitted. In this case, the second transport block may be distinct from the first transport block through the scheduling request or the preamble.

The terminal may receive allocation information on the first reference signal and allocation information on the second reference signal from the base station. In this case, the terminal may randomly select the first reference signal and the second reference signal.

The terminal may receive an uplink grant from the base station when decoding of the first transport block fails. The terminal may retransmit the first transport block on the basis of the uplink grant. The first transport block may be no longer transmitted through the first grant-free uplink resource when the second transport block is transmitted or the uplink grant is received. That is, the first transport block was able to be transmitted initially or repeatedly through the first grant-free uplink resource. However, if the terminal receives the uplink grant for retransmission, the terminal may retransmit or repeatedly transmit the first transport block through a resource scheduled with the uplink grant.

In addition, the terminal may receive allocation information on a second grant-free uplink resource which is scheduled semi-statically from the base station. The second transport block may be transmitted through the second grant-free uplink resource by using/based on the second reference signal. The first grant-free uplink resource and the second grant-free uplink resource may be allocated to different subframes. This is because maximum power that can be used when the terminal transmits the first transport block and the second transport block may be restricted if the first grant-free uplink resource and the second grant-free uplink resource are allocated to the same subframe.

An operation at the base station after the terminal informs the base station of first transmission points of the first transport block and the second transport block will be described below.

Specifically, the first transmission point of the first transport block may be confirmed by the base station by using/based on the first reference signal. The first transmission point of the second transport block may be configured by the base station by using/based on the second reference signal. The base station may recognize that a new transport block is received through the change of the reference signal from the first reference signal to the second reference signal.

Accordingly, the repeatedly transmitted first transport blocks may be combined and decoded by the base station. The base station may have to combine all of the repeatedly transmitted first transport blocks to perform decoding. The second transport block may be decoded by the base station without being combined with the first transport block. Since the base station can distinguish the first transport block and the second transport block through the second reference signal, the second transport block may be decoded separately from the first transport block.

By using the proposed scheme, a terminal selectively performs uplink transmission using a grant-based resource and a grant-free resource, thereby improving reliability of a transmission signal. In addition, since a start point of repeated transmission is reported to a base station, there is an advantage in that complexity of the base station can be decreased and an uplink signal combining gain can be obtained.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
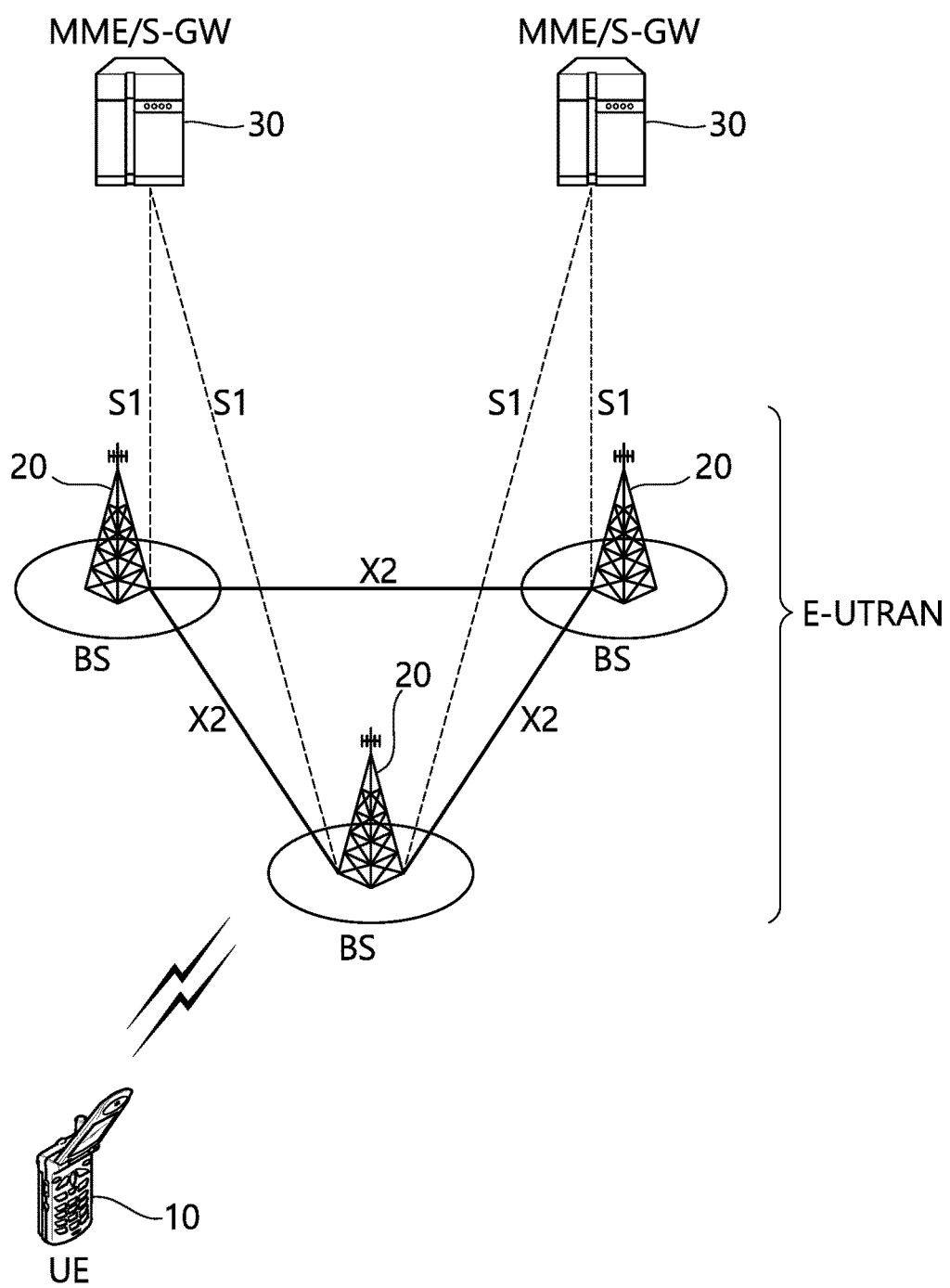
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
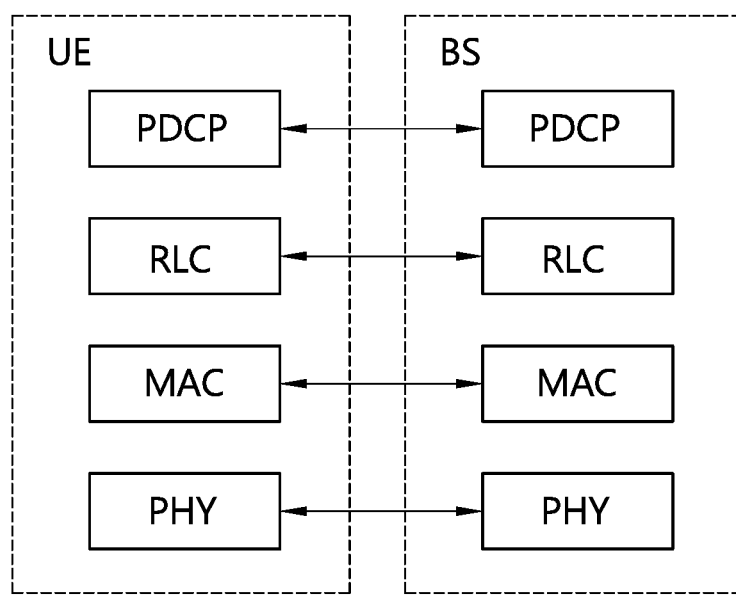
FIG. 2 is a diagram illustrating a radio protocol architecture for a user plane.
Figure 3:
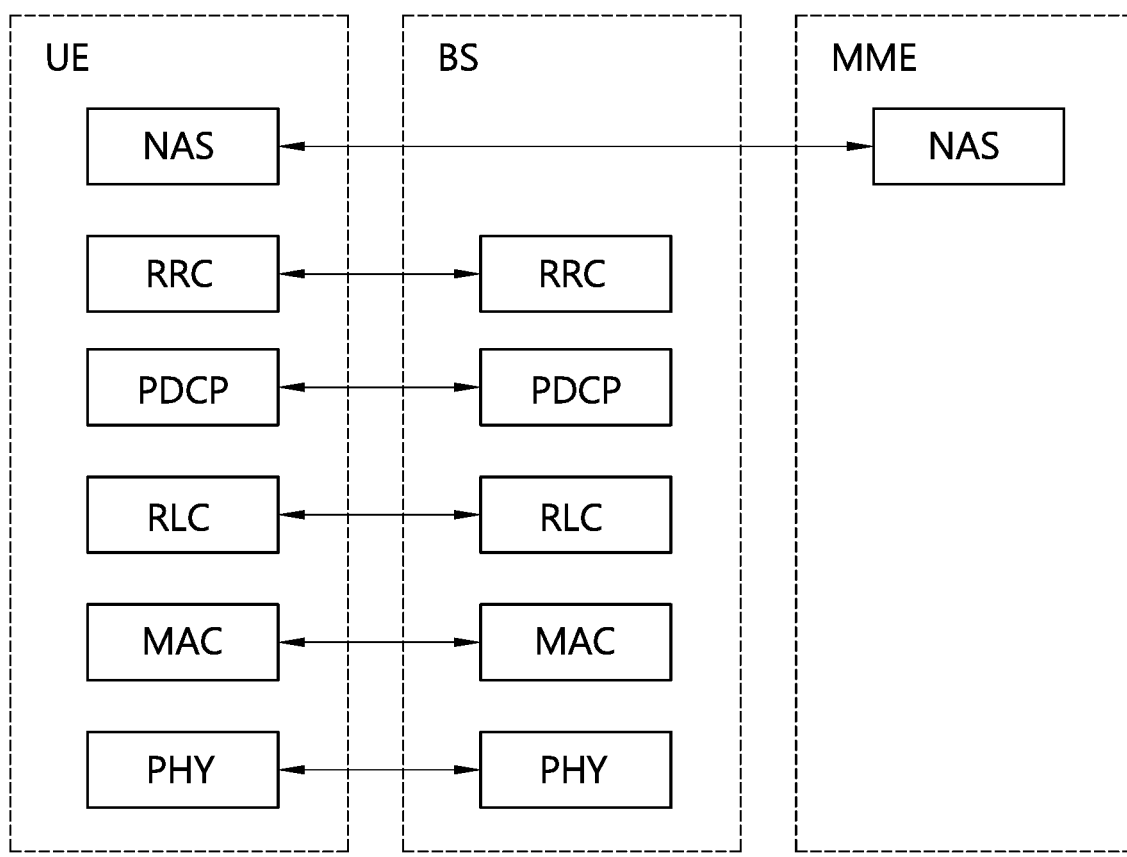
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 4:
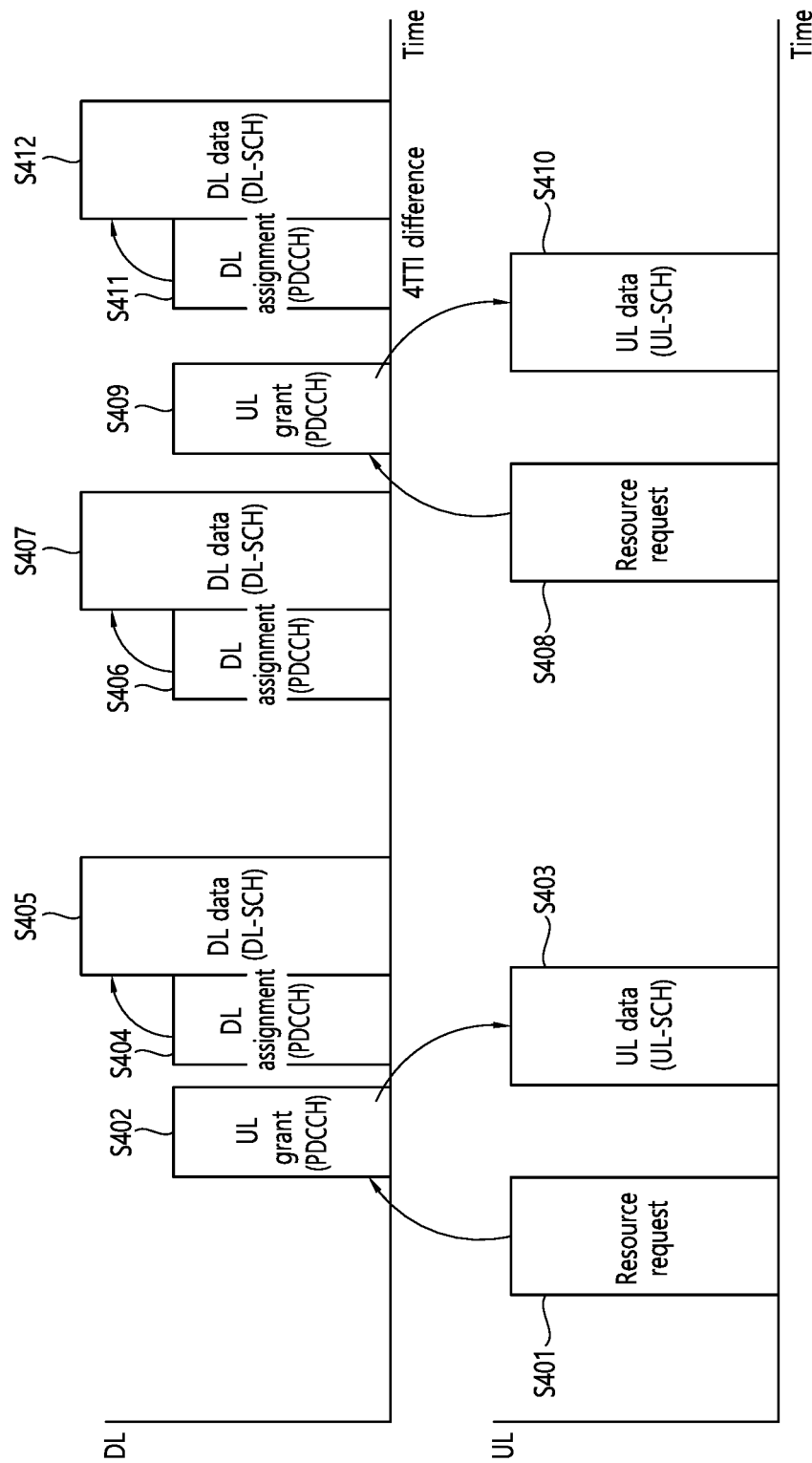
FIG. 4 is a drawing for explaining a method of dynamically assigning a radio resource.
Figure 5:
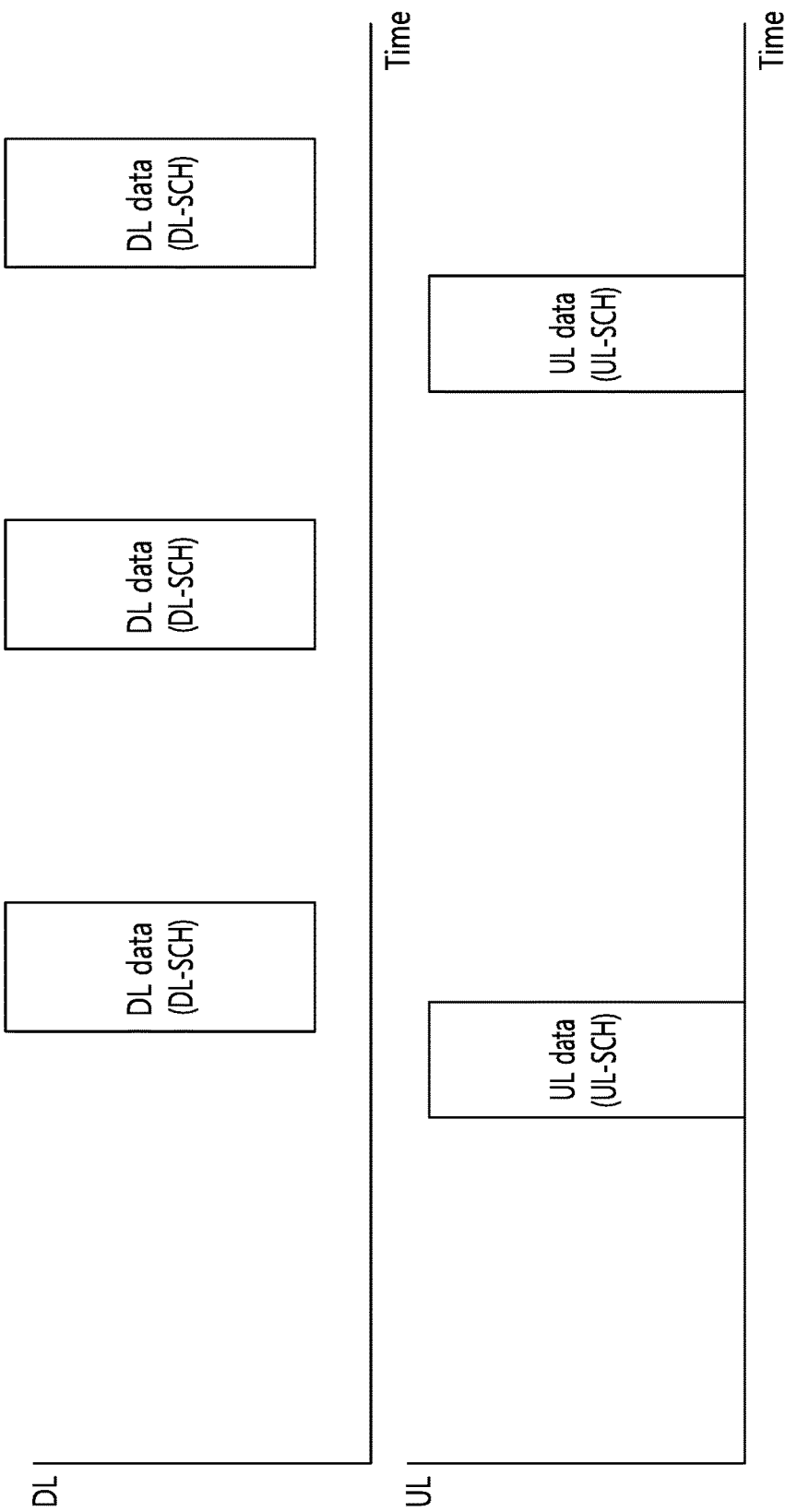
FIG. 5 is a drawing for explaining an SPS method.

FIG. 4 is a drawing for explaining a method of dynamically assigning a radio resource. FIG. 5 is a drawing for explaining an SPS method.

A typical process of transmitting data from a UE to an eNB (a method of dynamically assigning a radio resource) is described below with reference to FIG. 4. First, the UE may request the eNB to provide a radio resource required for transmission of generated data (S401). Therefore, the eNB may assign the radio resource through a control signal according to a radio resource request of the UE (S402). In an LTE system, the resource assignment of the eNB for transmitting UL data of the UE may be transmitted through a UL grant transmitted through a PDCCH. Therefore, the UE may transmit data to the eNB through the assigned radio resource (S403). The radio resource request of the UE, the resource assignment of the eNB, and corresponding UL data transmission of the UE may be optionally repeated (S408 to S410).

Meanwhile, when the eNB transmits downlink (DL) data to the UE, a DL assignment message may be transmitted to the UE through the PDCCH to know through which radio resource the data transmitted to the UE is transmitted (S404), and the eNB may transmit data to the UE through a radio resource corresponding to the DL assignment message (S405). In this case, DL assignment information transmission and DL data transmission through a radio resource corresponding thereto may be achieved in the same transmission time interval (TTI). Further, as shown in FIG. 4, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 5. That is, in the SPS method, the eNB does not have to transmit radio resource assignment information all the time through the PDCCH.

Hereinafter, the technology related to 3GPP 5G (New RAT) will be described in detail.

As a larger number of communication devices demand an even larger communication capacity, discussions are being made on the need for a mobile broadband that is more enhanced than the conventional radio access technology (RAT). Additionally, one of the major issues that are to be considered in the next generation communication relates to massive Machine Type Communications (MTC), which connects multiple devices to multiple objects so as to provide diverse services regardless of time and place. Moreover, discussions are being made on a communication system design considering services/terminals (user equipment (UE)) that are sensitive to reliability and latency. As described above, discussions are being made on the adoption of a next generation RAT that considers enhanced mobile broadband communication (eMBB), massive MTC (mMTC), Ultra-Reliable and Low Latency Communication (URLLC), and so on. And, in this specification, the corresponding technology will be referred to as new RAT for simplicity.

Hereinafter, the proposed method is described based on the new RAT system for simplicity in the description. However, in addition to the new RAT system, the scope of the system to which the proposed method is applied may be extendedly applied to other system, such as 3GPP LTE/LTE-A systems, and so on.

The new RAT system uses an OFDM transmission scheme or a similar transmission scheme, and the new RAT system may mainly have an OFDM numerology shown in Table 1. Alternatively, the new RAT system may follow the conventional numerology of LTE/LTE-A without any modification. However, in this case, the new RAT system may have a larger system bandwidth (e.g., 100 MHz). Alternatively, one cell may support a plurality of numerologies. More specifically, multiple UEs (or terminals) each operating on a different numerology may co-exist in one cell. Hereinafter, Table 1 shown below represents OFDM parameters of the new RAT system.

TABLE 1

| Parameter | Value |
| --- | --- |
| Subcarrier-spacing (Δf) | 75 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

Hereinafter, a self-contained subframe structure will be described in detail.

Figure 6:
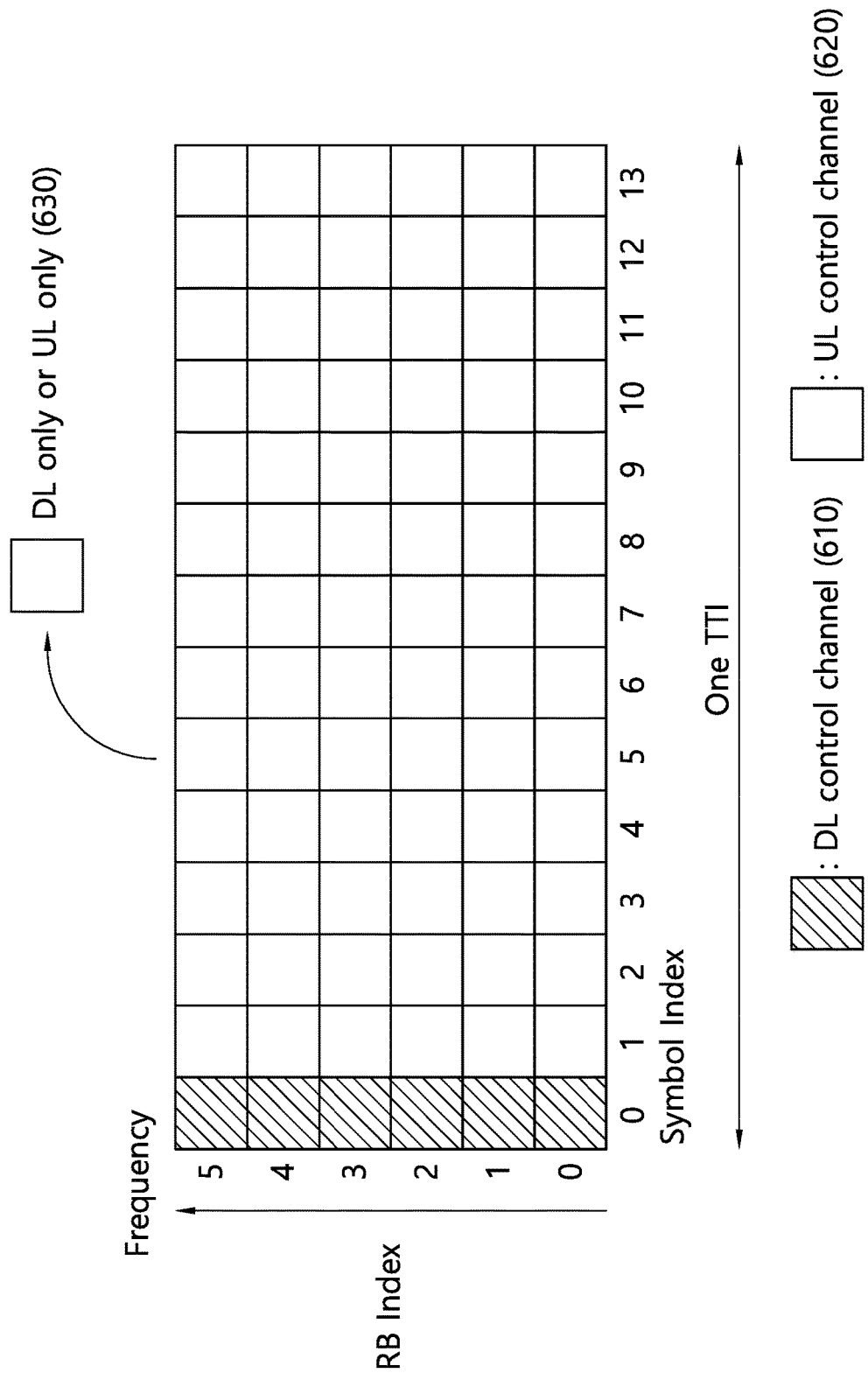
FIG. 6 shows a self-contained subframe structure.

FIG. 6 shows a self-contained subframe structure.

In the TDD system, in order to minimize data transmission latency, as shown in FIG. 6, a self-contained subframe structure (or architecture) is being considered in the new RAT.

In FIG. 6, a region (610) located in front of the self-contained subframe represents a transmission region of a physical channel PDCCH for transporting (or delivering) Uplink Control Information (UCI). A region (620) located behind the self-contained subframe represents a transmission region of a physical channel PUCCH for transporting (or delivering) Uplink Control Information (UCI). Herein, control information being delivered to the UE by the eNB via the DCI includes information related to a cell configuration that should be known by the UE, DL-specific information, such as DL scheduling, and so on, and UL-specific information, such as UL grant, and so on. And, control information being delivered to the eNB by the UE via the UCI includes an ACK/NACK report of an HARQ for DL data, a CSI report for a DL channel status, scheduling request (SR), and so on.

In FIG. 6, a physical channel PDSCH for transmitting downlink data or a physical channel PUSCH for transmitting uplink data may be used in a region (630) located at a center of the self-contained subframe. As a characteristic of the above-described structure (or architecture), a DL transmission and a UL transmission are sequentially performed in one subframe. Thus, DL data may be transmitted from the subframe, and a UL ACK/NACK may be received in the subframe. As a result, a time consumed for performing data retransmission when a data transmission error occurs may be reduced, and, accordingly, latency in the transfer of a final data may be minimized.

In the above-described self-contained subframe structure, a time gap is needed for the base station (or eNB) and the UE to perform a process of shifting from a transmission mode to a reception mode or to perform a process of shifting from a reception mode to a transmission mode. For this, in the self-contained subframe, part of an OFDM symbol corresponds to a guard period (GP).

Hereinafter, analog beamforming will be described in detail.

In a Millimeter Wave (mmW), since the wave becomes shorter, multiple antenna elements may be installed in the same surface. More specifically, in a 30 GHz band, since the wave is equal to 1 cm, a total of 100 antenna elements may be installed in a 2-dimensional alignment format on a 5 by 5 cm panel at an interval of 0.5 lambda (wave). Therefore, the mmW seeks to increase the coverage or to increase throughput by increasing a beamforming (BF) gain using multiple antenna elements.

In this case, if a Transceiver Unit (TXRU) is provided so as to enable transport power and phase control per antenna element, independent beamforming per frequency resource may be performed. However, since the TXRU needs to be installed in all of a hundred or more antenna elements, there lies a problem of degraded effectiveness in light of cost. Therefore, a method of mapping multiple antenna elements to one TXRU and controlling a beam direction by using an analog phase shifter is being considered. Such analog beamforming method is disadvantageous in that, since this method can generate only one beam direction within the entire band, frequency-selective beamforming cannot be carried out.

As an intermediate form of digital BF and analog BF, a hybrid BF having B number of TXRUs, which is less than Q number of antenna elements, may be considered. In this case, although differences may exist depending upon the connection method of the b number of TXRUs and the Q number of antenna elements, the number of beam directions may be limited to B or less.

In this specification, for simplicity in the description, a channel through which downlink data is transmitted will be referred to as PDSCH, and a channel through which uplink data is transmitted will be referred to as PUSCH. In this specification, for simplicity in the description, although the present invention is described mostly based on a downlink environment (PDSCH transmission), it will be apparent that the details of this specification can also be applied to an uplink environment (PUSCH transmission).

Figure 7:
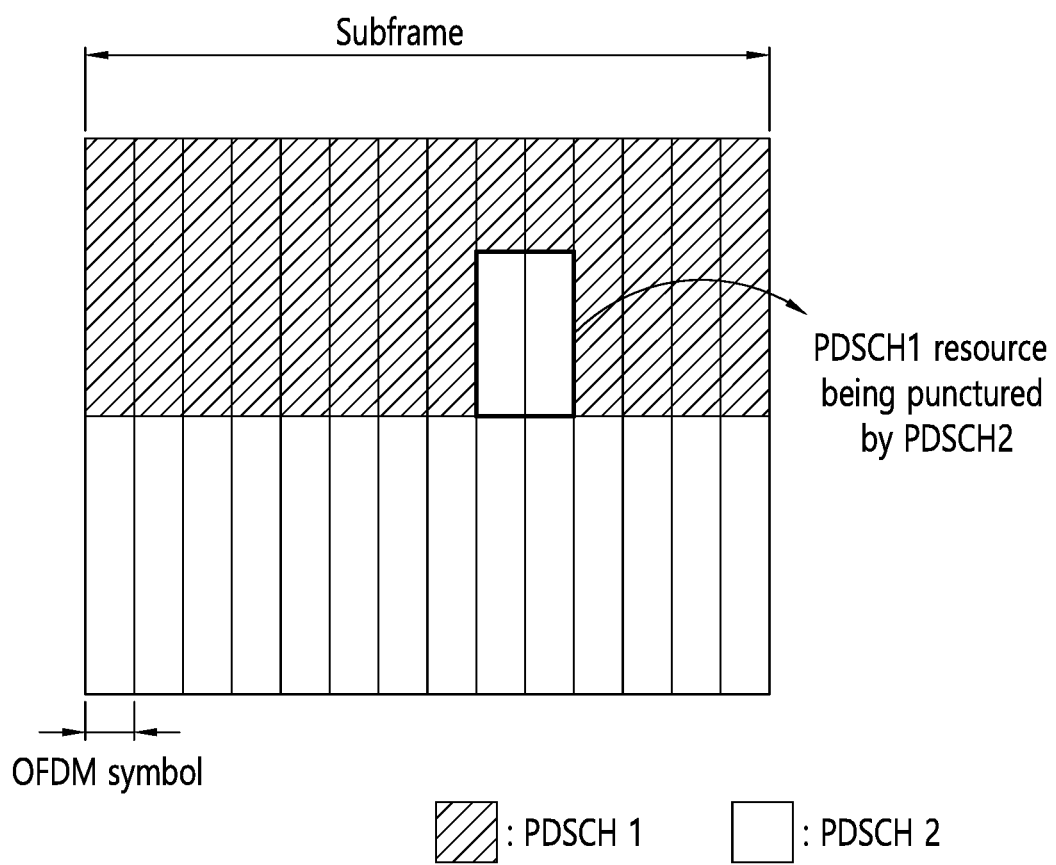
FIG. 7 shows an exemplary usage of resource in a case where URLLC data and eMBB data are multiplexed and transmitted in a same frequency resource of a same cell.

FIG. 7 shows an exemplary usage of resource in a case where URLLC data and eMBB data are multiplexed and transmitted in a same frequency resource of a same cell.

At this point, in case data being sensitive to latency (e.g., URLLC data) is multiplexed with data being relatively less sensitive to latency (e.g., eMBB data) in a same frequency resource of a same cell and then transmitted, contention may occur between the transmission resources of the two data. At this point, since the transmission of latency-sensitive data (or data being sensitive to latency) generally has a higher priority, as shown in FIG. 7, data being sensitive to latency (PDSCH 2) may be transmitted by puncturing the resource of data being less sensitive to latency (PDSCH 1). In this case, since the data being less sensitive to latency (PDSCH 1) is generally transmitted with a TTI length that is longer than the data being more sensitive to latency (PDSCH 2), part of the OFDM symbol region of the data being less sensitive to latency (PDSCH 1) is generally punctured for the transmission of the data being more sensitive to latency (PDSCH 2).

In this case, the data having part of the resource region punctured may experience interference in the corresponding resource, and a significant degradation in performance may occur, accordingly. Therefore, a method for enhancing the performance (or capability) of receiving the transmission data being punctured for the transmission of other data is needed.

Hereinafter, a Grant-free UL transmission will be described in detail.

The Grant-free UL transmission method corresponds to a method of transmitting uplink data in a UE-common resource that is scheduled in advance by the UE. Since the UE transmits uplink data from a resource that is scheduled in advance, this method is advantageous in that data can be transmitted faster than an SR-triggered UL transmission method, which transmits a signal after receiving a UL grant. However, this method is disadvantageous in that, since the signal is transmitted from a UE-common resource, a contention may occur. Herein, a contention refers to an effect of having different UEs each transmit a signal from the same resource.

Additionally, the Grant-free UL resource needs to be reallocated. A Grant-free UL resource corresponds to a resource that is allocated to a UE by a base station after the base station predicts required resources in advance before UE data is generated. If the base station allocates more Grant-free UL resources than needed, the likelihood of contention may be decreased. However, this method is disadvantageous in that resources are wasted. Conversely, if the base station allocates less Grant-free UL resources than needed, the consumption (or waste) of resource may be reduced. However, since the likelihood of contention increases, the targeted reliability cannot be achieved. Therefore, the number of Grant-free UL resources needs to be controlled while considering the number of UEs, the UE traffic characteristic, channel status, and so on. In order to satisfy the targeted reliability, the following factors shall be considered when allocating Grant-free UL resources.

1) Likelihood of signal contention—The likelihood of signal contention occurring between one another within the Grant-free UL resource is determined according to the number of UEs and the size of traffic generated by the UEs. Although the base station may be capable of identifying the number of UEs, it is difficult for the base station to accurately predict the traffic generated by each UE. Generally, when generating traffic, the UE uses statistical characteristics of traffic. Additionally, in order to overcome the limitations in the statistical prediction of traffic, a method of increasing the size of the Grant-free UL resources when the likelihood of contention occurrence is high and decreasing the size of the Grant-free UL resources when the likelihood of contention occurrence is low may be used.

2) Increase in data size—If the data size increases, the code rate and symbol modulation order, which can be applied when signal is transmitted from a pre-allocated size of the Grant-free UL resource, are increase. Accordingly, since the likelihood of successful reception of the Grant-free UL transmission decreases, a method for resolving this problem is needed.

3) Dynamic TDD—In the NR, a dynamic TDD method allowing DL and UL to be selected in each subframe is expected to be adopted. When it is assumed that a Grant-free UL resource is semi-statically and periodically scheduled, in the dynamic TDD, a subframe having a grant-free UL resource pre-allocated thereto is changed to a DL subframe, thereby causing the grant-free UL resource to be omitted. When part of a periodic grant-free resource is omitted, additional latency may occur during the UL data transmission due to such omission. And, in this case, since the stand-by (or waiting) time becomes longer, when performing grant-free UL transmission afterwards, the likelihood of data contention increases. Therefore, a method for resolving the above-described problem is needed.

4) Change in channel—In case a channel between a UE and the base station is degraded, the size of the Grant-free UL resources needs to be increased. In order to estimate the uplink channel, the base station may request the UE to transmit an uplink reference signal (e.g., SRS).

At present, there is ongoing discussion on grant-free UL transmission in the 3GPP new RAT (NR) study item. Grant-free transmission implies that transmission is performed on an uplink resource scheduled semi-persistently. The grant-free transmission may be divided into contention-based transmission in which different UEs share the same time-frequency resource and transmission using dedicated resources. Although only the grant-free transmission using the designated resources is supported in the conventional LTE, it seems that contention-based grant-free UL transmission will also be introduced in the NR. That is, a plurality of UEs may transmit uplink data on the contention-based grant-free resource.

With the introduction of the contention-based grant-free UL transmission in the NR, there is a need to define an operation for a case where a UE to which a contention-based grant-free resource is allocated additionally receives a UL grant. In addition, since UL transmission is repeated, a plurality of contention-based grant-free UL resource may be allocated to the UE, and dedicated grant-free UL resources may also be allocated. Therefore, there is a need to develop an operation of the UE when the UL grant is received by considering various situations.

A subframe used in the present specification may be replaced with a slot or a mini slot. The content of the present specification is only an embodiment, and is also applicable to another embodiment using a similar operation.

1. Switching Method Between Grant-Based UL Transmission and Grant-Free UL Transmission.

In an embodiment 1, if a UE receives a UL grant in a state where a grant-free UL resource is semi-statically allocated, the UE transmits a transport block (TB) on a resource scheduled with a UL grant, and temporarily does not transmit the TB on a contention-based grant-free UL resource. When the UE does not receive the UL grant, uplink transmission is performed on the grant-free UL resource.

Whether collision occurs in the grant-free UL resource may be transferred from a BS to the UE through higher layer signaling such as RRC signaling. Alternatively, the BS may indicate an operation for a case where the UL grant is received by the UE to which the grant-free UL resource is allocated, through the higher layer signaling such as the RRC.

The operation of the embodiment 1 may be applied only when the grant-free UL resource is a contention-based resource. Alternatively, the operation of the embodiment 1 may be applied only when a first temporary identifier included in the UL grant is identical to a second temporary identifier used when the grant-free UL resource is activated. Alternatively, the operation of the embodiment 1 may be performed only when the UL grant is a UL grant for retransmission. The BS may use RRC signaling to indicate whether the UE will perform the operation of the embodiment 1 and the operation based on the temporary identifier. Herein, the operation of the embodiment 1 may correspond to an operation for performing uplink transmission according to whether the UL grant is received in a state where the grant-free UL resource is semi-statically allocated to the UE. The operation based on the temporary identifier may correspond to an operation of performing uplink transmission for a case where the temporary identifier included in the UL grant is identical to a temporary identifier of the UE when the UE receives the UL grant.

In case of the contention-based grant-free resource, collision may occur between signals transmitted by different UEs. Therefore, it may be considered a scheme of avoiding collision by transmitting a signal on a corresponding resource when a grant-based uplink resource is allocated to the UE. In addition, since a scheduled UE transmits an uplink signal on a resource different from the grant-free UL resource, there is an advantage in that a collision probability is decreased at the grant-free UL resource. In addition, even if a grant-free UL resource allocated to the UE is temporarily unavailable, the BS may allocate a temporary resource through the UL grant. For example, it may be considered a case where the grant-free UL resource is preoccupied for grant-based UL transmission.

In addition to the embodiment 1, the operation of the embodiment 1 is performed in a case where the UE's first temporary identifier (e.g., C-RNTI) included in the UL grant received by the UE is identical to a UE's third temporary identifier used when the contention-based grant-free resource is activated. If a UL grant including another temporary identifier is received, the UE performs uplink transmission on both the existing grant-free resource and the grant-based resource.

When a plurality of temporary identifiers are allocated to the UE, each temporary identifier may be mapped to a different service (or bearer). If the UL grant is transmitted for uplink transmission of a service different from a service being transmitted on the grant-free resource, it may not be appropriate that the UE transmits a TB for grant-free transmission on a grant-based resource scheduled by the UL grant.

In addition to the embodiment 1, instead of transmitting the TB on a grant-free UL resource allocated to an n-th subframe after a subframe (or slot or mini slot) in which the UL grant is received, the UE transmits the TB on the resource scheduled with the UL grant. Herein, n is an integer value greater than 0. For example, n=0 when uplink data transmission is immediately possible in a subframe in which the UL grant is received by applying a self-contained frame structure.

In general, the UE may transmit uplink data after a k-th subframe from reception of the UL grant. Therefore, a duration in which the grant-free UL transmission is not performed may be determined by considering a delay time until uplink data is transmitted after the UL grant is received.

In an embodiment 2, when a UL grant received by a UE is for retransmission, the UE performs transmission on a resource scheduled with the UL grant instead of performing retransmission or repeated transmission on a grant-free UL resource. For example, the UE may transmit a signal on the grant-free UL resource only when a TB is first transmitted. For another example, when the UE can repeat UL transmission n times on the grant-free resource, if a UL grant for retransmission is received before repeated transmission is completely performed n times, transmission on the grant-free UL resource stops, and subsequent repeated transmission is performed on a resource scheduled with the UL grant.

Repeated transmission on the grant-free UL resource may cause an increase in a collision probability when signals are transmitted between UEs. Therefore, when the UE receives the UL grant for retransmission from a BS, preferably, uplink data is transmitted on a resource scheduled with the UL grant.

In an embodiment 3, if a UE receives a UL grant in a subframe (or slot or mini slot) in which a release signal or stop signal of a grant-free UL resource is received, the UE transmits a TB by using the UL grant. On the contrary, if the UE receives the UL grant in a subframe (or slot or mini slot) in which the release signal or the stop signal is not received, the UE may perform uplink transmission on both of grant-free and grant-based resources or by selecting one of the grant-free and grant-based resources.

The above operation aims to maximize reliability of an uplink signal by allowing the UE to be capable of transmitting the signal on all resources scheduled from a BS.

Figure 8:
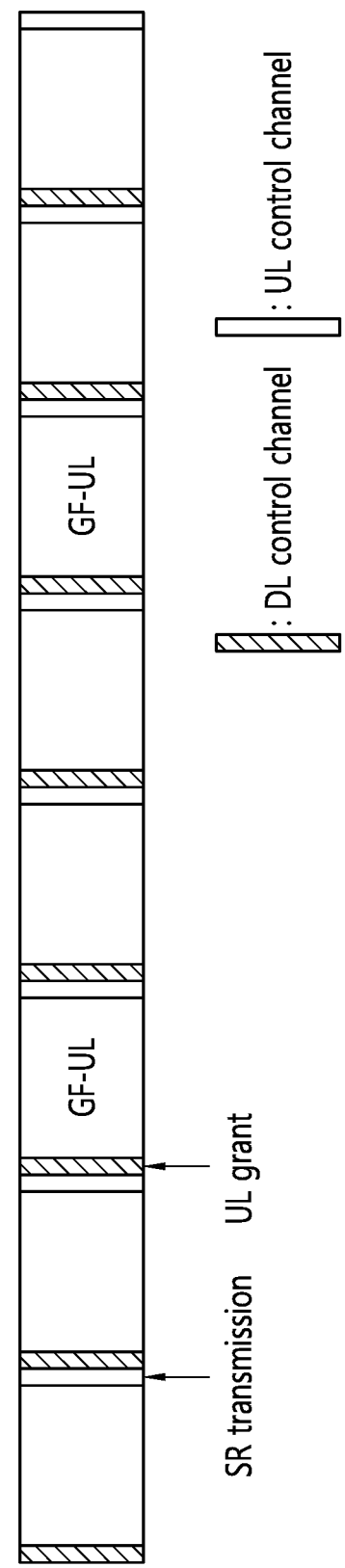
FIG. 8 shows an example in which a UE to which a grant-free UL resource is allocated receives a UL grant according to an embodiment of the present specification.

FIG. 8 shows an example in which a UE to which a grant-free UL resource is allocated receives a UL grant according to an embodiment of the present specification.

As shown in FIG. 8, for URLLC DL transmission, the UE may transmit an SR in a subframe in which a grant-free UL resource does not exist, thereby attempting grant-based UL transmission. If a self-contained frame structure is applied, since the UE may attempt uplink transmission in a subframe in which a UL grant is received, a resource used by the UE for transmission may be selected from a grant-free UL resource allocated in advance to the UE and a grant-based resource. If the grant-free UL resource allocated to the UE is a contention-based resource, it is reasonable for the UE to attempt to transmit a signal on the grant-based resource.

In addition, in the embodiment 3, there is a need for a scheme for informing that the same TB is transmitted when the UE transmits the same TB on the grant-free UL resource and the grant-based UL resource.

In a case where the TBs transmitted by the UE on the grant-free UL resource and the grant-based UL resource are the same TB, signaling for informing this is necessary. For example, when a DMRS 1 is allocated to the UE on the grant-free UL, the UE transmits the same signal by using the DMRS 1 also on the grant-based UL resource. For example, when the UE randomly selects the DMRS 1 on the grant-free UL resource, the same signal is transmitted by using the DMRS 1 also on the grant-based UL resource. For example, it is assumed a case where the UE transmits a separate signal (e.g., a preamble or a scheduling request) in order to transmit a UE identifier when grant-free UL transmission is performed. A mapping relation between the separate signal and the DMRS used in the grant-based UL transmission may be designated by a BS in advance through RRC signaling or may be agreed systematically. On the contrary to the above embodiment, if the TB transmitted by the UE is different in the grant-free UL and grant-based UL transmission, the UE transmits a signal by using the different DMRS or transmits a signal on the grant-based UL resource by using the DMRS which is not agreed in advance.

When the grant-free UL resource is shared by several UEs, collision of a DMRS of each UE can be avoided by allocating a different DRMS to each UE. In this case, since distortion does not occur in channel estimation, preferably, decoding is performed by combining a grant-free UL transmission signal and a grant-based UL transmission signal. In general, since the grant-based UL resource is a UE-dedicated resource, each UE may inform that the same TB is transmitted by transmitting signals by the use of a DMRS in the grant-based UL resource as the same value as a DMRS allocated to the UE on the grant-free UL resource. In this case, the DMRS allocated to the UE by the BS by using the UL grant may be configured to be used only when a TB transmitted on the grant-free UL resource is different from a TB transmitted on the grant-based UL resource.

There may be a case where each UE randomly selects a DMRS while the grant-free UL resource is shared by several UEs. In this case, the UE may transmit an additional signal such as a scheduling request or a preamble to inform the BS of whether a signal of the UE is transmitted. Since the UE randomly selects the DMRS, different UEs may transmit signals by using the same DMRS. In this case, channel estimation is distorted, and thus the grant-based UL signal and the grant-free UL signal are preferably not combined. Whether to combine the signals may be determined by the BS. For example, when the BS receives signaling implying UL transmission from different UEs but only one DMRS is detected, it may be regarded that collision occurs, and thus the grant-based signal and the grant-free signal may not be combined.

In addition, in the embodiment 3, duplicate transmission may be performed only when an interval between a grant-free UL resource and a grant-based UL resource is n subframes (or slots or mini slots).

In general, the grant-free UL resource is periodically allocated. There is a need to consider a case where signals are transmitted both on a previous grant-free UL resource and a next grant-free UL resource. Therefore, when a TB transmitted on the grant-free UL resource is repeatedly transmitted on the grant-based UL resource, the BS needs to recognize which grant-free UL resource is used to transmit the TB.

The operation of the embodiment 3 may be applied only when the grant-free UL resource is a contention-based resource. Alternatively, the operation of the embodiment 3 may be applied only when a temporary identifier included in a UL grant is identical to a temporary identifier used when the grant-free UL resource is activated.

2. Method of Indicating Start Point of Repeatedly Transmitted Signal

When a UE performs repeated transmission on a grant-free UL resource, a BS needs to recognize a start point of a repeatedly transmitted signal in order to combine the repeatedly transmitted signals. Therefore, the present embodiment proposes a scheme of informing the start point of the repeated signal.

A case where an uplink TB is transmitted n times is assumed in the present embodiment. Herein, n is an integer value granter than 1. In addition, a redundancy version (RV) or the like may change or may not change in every repeated transmission.

In an embodiment 4, when the UE transmits a new TB on a grant-free UL resource, a signal is transmitted by changing a DMRS resource. Through the change of the DMRS, a BS recognizes whether the new TB is transmitted. For example, the UE may change a sequence of the DMRS within a grant-free resource 1 to inform of new TB transmission. For another example, the UE may transmit the same DMRS sequence on different grant-free resources in order to inform of new TB transmission. A rule by which a DMRS is changed in new TB transmission may be informed from the BS to the UE through higher layer signaling such as RRC signaling.

In the embodiment 4, one grant-free UL resource may be periodically allocated and may be frequency hopped. The BS may combine signals transmitted by the same UE by using the same DMRS when decoding is performed, and may not combine signals transmitted by the same UE by using different DMRSs when decoding is performed.

In the embodiment 4, it is assumed a case where the grant-free UL resource is allocated to the UE. One grant-free UL resource may be periodically allocated and may be frequency hopped.

When a UE 1 transmits a TB 2 while repeatedly transmitting a TB 1 by using a DMRS 1, the UE performs transmission by using a DMRS 2. In this case, the UE may stop transmission of the TB 1 or may simultaneously transmit the TB 1 and the TB 2 by using different DMRSs without stopping the transmission. In order to instruct the above operation to the UE, the BS may additionally indicate a DMRS used in new TB transmission within one grant-free UL resource through higher layer signaling.

In the embodiment 4, it is assumed a case where a plurality of grant-free UL resources are allocated to the UE. One grant-free UL resource may be periodically allocated and may be frequency hopped. In addition, different grant-free UL resources may have different period start points.

When the UE has to transmit the TB 2 while repeatedly performing transmission of the TB 1 on a resource 1, transmission of the TB 2 starts on a resource 2. In this case, the UE transmits a signal by using a DMRS of the resource 1 and a DMRS of the resource 2, designated in advance by the BS. In order to instruct the above operation to the UE, the BS may indicate a DMRS used by the UE on each grant-free UL resource through higher layer signaling.

In an embodiment 5, only when a UE transmits a new TB on a grant-free UL resource, an additional signal such as a scheduling request or a preamble is transmitted. When the UE performs repeated transmission or retransmission for a TB, the additional signal is not transmitted. Upon receiving the additional signal, a BS recognizes that transmission of the new TB has started.

The embodiment 5 includes both of a case where the UE randomly selects a DMRS of a grant-free UL resource and a case where the DMRS is designated in advance.

In the embodiment 5, it is assumed a case where one grant-free UL resource is allocated to the UE. One grant-free UL resource may be allocated periodically and may be frequency hopped. When a TB 2 arrives while the UE performs repeated transmission for a TB 1, the UE stops repeated transmission of the TB 1 and newly transmits the TB 2. In addition, the UE transmits an additional signal to inform the BS of the start of new TB transmission.

There is a possibility that the BS decodes a TB which is being repeatedly transmitted. If TB decoding fails, the BS may transmit a UL grant for retransmission. Accordingly, preferably, the UE transmits a new TB by stopping transmission of a signal previously being transmitted. If the BS recognizes transmission of the new TB in a situation where the UE has failed to decode the TB1, the BS may transfer a UL grant for retransmission to the UE.

In addition, in order to perform the above operation, an allocation period of an additional signal shall be identical to an allocation period of the grant-free UL resource.

In the embodiment 5, it is assumed a case where a plurality of grant-free UL resources are allocated to the UE. One grant-free UL resource may be periodically allocated and may be frequency hopped. Different grant-free UL resources may have different period start points. When a TB 2 is buffered while the UE repeatedly transmits a TB 1 on a resource 1, the UE starts transmission of the TB 2 on a resource 2 while directly performing repeated transmission of the TB 1. In addition, when transmission of the TB 2 starts, an additional signal is transmitted to inform the BS of the fact that transmission of a new TB has started.

If the resource 1 and the resource 2 are allocated to the same subframe, maximum power that can be used by the UE in each transmission of the TB 1 and transmission of the TB 2 may be restricted. Therefore, the resource 1 and the resource 2 are preferably allocated to different subframes.

In addition, an additional signal shall be provided for each grant-free UL resource in order to perform the above operation. For example, if the grant-free UL resource 1 is allocated N1 times in unit time and the grant-free UL resource 2 is allocated N2 times in unit time, the additional signal shall be allocated (N1+N2) times in unit time. If uplink transmission is repeated K times and a new TB cannot be transmitted in repeated transmission, the additional signal shall be allocated (N1+N2)/K times in unit time.

Figure 9:
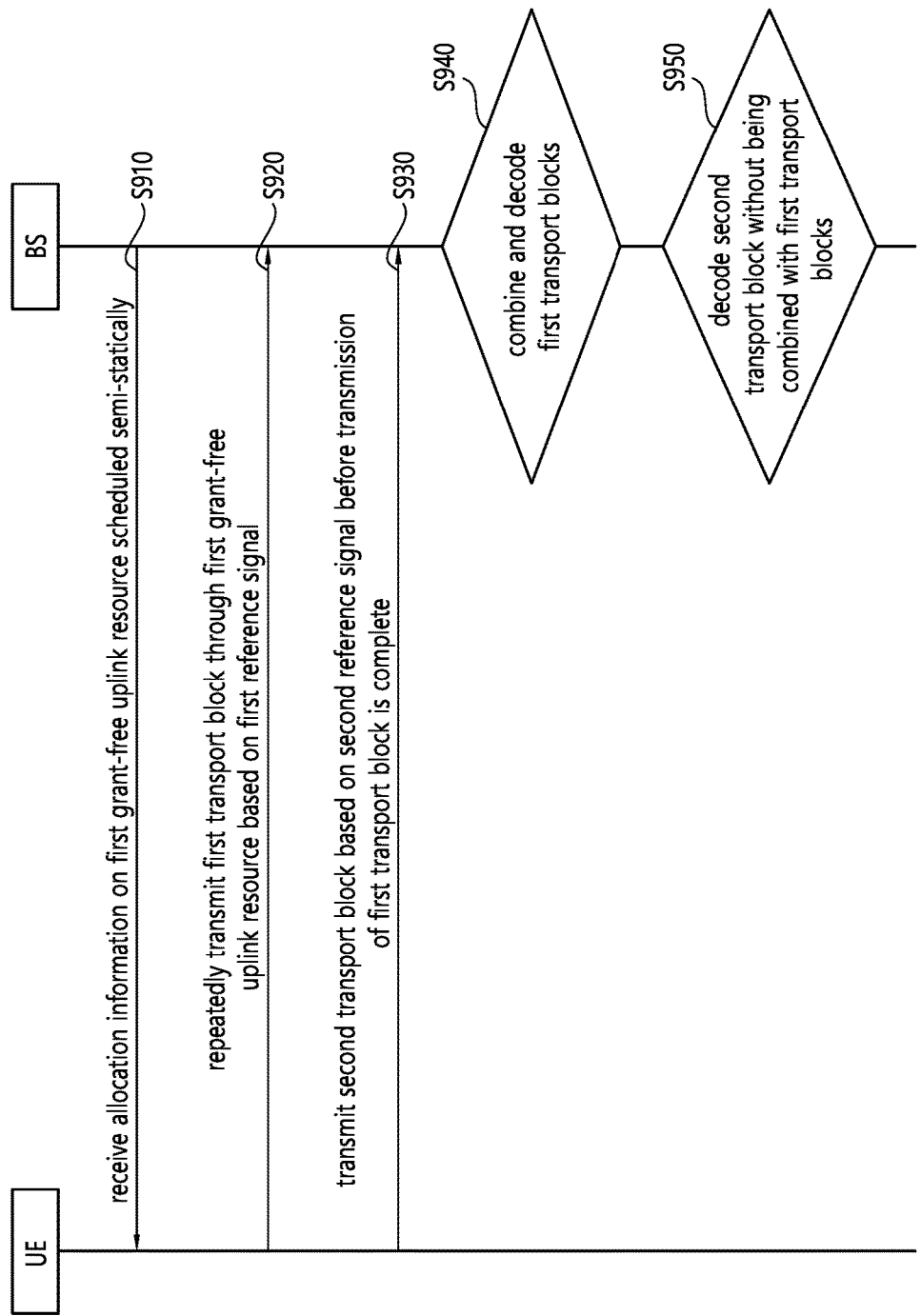
FIG. 9 illustrates a procedure of transmitting an uplink transport block through a grant-free UL resource according to an embodiment of the present specification.

FIG. 9 illustrates a procedure of transmitting an uplink transport block through a grant-free UL resource according to an embodiment of the present specification.

The present embodiment assumes that a UE repeatedly transmits an uplink transport block through a pre-scheduled grant-free UL resource. In this case, in order to combine and decode the repeatedly transmitted transport blocks, a BS needs to know a first transmission point of the transport block. The present embodiment includes various embodiments in which the UE informs the BS of the first transmission point of the transport block.

Grant-free UL transmission may correspond to a scheme in which uplink data is transmitted without an uplink grant. Therefore, there is an advantage in that data can be transmitted faster than the uplink transmission scheme based on the uplink grant. In addition, a grant-free UL resource is a resource common to the UE, and collision may occur since different UEs transmit signals simultaneously on the same resource. However, a case where one UE transmits a signal is assumed in the present embodiment.

First, in step S910, the UE receives allocation information on a first grant-free uplink resource which is scheduled semi-statically from a BS. In this case, it may be assumed that one grant-free uplink resource is allocated to the UE.

In step S920, the UE repeatedly transmits a first transport block through the first grant-free uplink resource by using/based on a first reference signal.

In step S930, the UE transmits a second transport block by using/based on a second reference signal before the transmission of the first transport block is complete. Since the UE may transmit the second transport block before transmission of the first transport block is complete, the UE may transmit the second transport block even at a time of waiting for reception of a response signal (ACK/NACK signal) in response to the first transport block by repeatedly transmitting the first transport block. In this case, the first reference signal and the second reference signal may correspond to a demodulation reference signal (DMRS).

The second transport block may be transmitted through the first grant-free uplink resource. A sequence of the second reference signal may be different from a sequence of the first reference signal. Therefore, the second transport block may be distinct from the first transport block based on a change of the first reference signal to the second reference signal. That is, in order to inform the BS of the fact that the second transport block different from the first transport block is transmitted, the UE may change the first reference signal (a sequence of the first reference signal) to the second reference signal (a sequence of the second reference signal) within the first grant-free uplink resource.

In addition, the first transport block may be no longer transmitted or be transmitted simultaneously with the second transport block when the second transport block is transmitted. The first transport block and the second transport block may be transmitted simultaneously through the same resource since different reference signals are used.

In addition, the UE may receive allocation information on the first reference signal and allocation information on the second reference signal from the BS. The allocation information on the first reference signal and the allocation information on the second reference signal may be received through radio resource control (RRC) signaling. The allocation information may include a rule regarding how a reference signal changes when a new transport block is transmitted.

In addition, the UE may receive allocation information on a second grant-free uplink resource which is scheduled semi-statically from the BS. In this case, it may assumed that a plurality of grant-free uplink resources are allocated to the UE.

Allocation information on the first grant-free uplink resource and allocation information on the second grant-free uplink resource may be received through RRC signaling.

Each of the first grant-free uplink resource and the second grant-free uplink resource may be periodically allocated and be frequency hopped. A start point of a period of the first grant-free uplink resource and a start point of a period of the second grant-free uplink resource may be different from each other. In this case, the second transport block may be transmitted through the second grant-free uplink resource by using/based on the second reference signal.

For another example, the UE may additionally transmit a scheduling request or a preamble when the second transport block is transmitted. In this case, the second transport block may be distinct from the first transport block through the scheduling request or the preamble.

The UE may receive allocation information on the first reference signal and allocation information on the second reference signal from the BS. In this case, the UE may randomly select the first reference signal and the second reference signal.

The UE may receive an uplink grant from the BS when decoding of the first transport block fails. The UE may retransmit the first transport block on the basis of the uplink grant. The first transport block may be no longer transmitted through the first grant-free uplink resource when the second transport block is transmitted or the uplink grant is received. That is, the first transport block was able to be transmitted initially or repeatedly through the first grant-free uplink resource. However, if the UE receives the uplink grant for retransmission, the UE may retransmit or repeatedly transmit the first transport block through a resource scheduled with the uplink grant.

In addition, the UE may receive allocation information on a second grant-free uplink resource which is scheduled semi-statically from the BS. The second transport block may be transmitted through the second grant-free uplink resource by using/based on the second reference signal. The first grant-free uplink resource and the second grant-free uplink resource may be allocated to different subframes. This is because maximum power that can be used when the UE transmits the first transport block and the second transport block may be restricted if the first grant-free uplink resource and the second grant-free uplink resource are allocated to the same subframe.

An operation at the BS after the UE informs the BS of first transmission points of the first transport block and the second transport block will be described in step S940 and step S950.

Specifically, the first transmission point of the first transport block may be confirmed by the BS by using/based on the first reference signal. The first transmission point of the second transport block may be configured by the BS by using/based on the second reference signal. The BS may recognize that a new transport block is received through the change of the reference signal from the first reference signal to the second reference signal.

Accordingly, in step S940, the repeatedly transmitted first transport blocks may be combined and decoded by the BS. The BS may have to combine all of the repeatedly transmitted first transport blocks to perform decoding. In step S950, the second transport block may be decoded by the BS without being combined with the first transport block. Since the BS can distinguish the first transport block and the second transport block through the second reference signal, the second transport block may be decoded separately from the first transport block.

Figure 10:
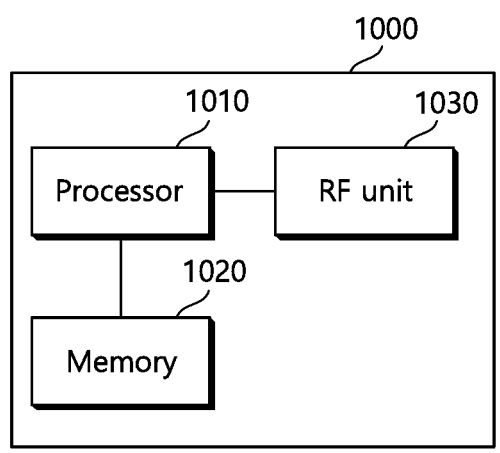
FIG. 10 is a block diagram showing an apparatus for wireless communication for implementing an embodiment of the present invention.

FIG. 10 is a block diagram showing an apparatus for wireless communication for implementing an embodiment of the present invention.

An apparatus 1000 for wireless communication includes a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting an uplink transport block in a wireless communication system, the method comprising:
  receiving, by a terminal, allocation information on a first grant-free uplink resource which is scheduled semi-statically from a base station;

repeatedly transmitting, by the terminal, a first transport block through the first grant-free uplink resource based on a first reference signal; and transmitting, by the terminal, a second transport block based on a second reference signal before the transmission of the first transport block is complete, wherein the second transport block is distinct from the first transport block based on a change of the first reference signal to the second reference signal.

2. The method of claim 1, wherein the second transport block is transmitted through the first grant-free uplink resource, and wherein a sequence of the second reference signal is different from a sequence of the first reference signal.

3. The method of claim 1, wherein a first transmission point of the first transport block is confirmed by the base station based on the first reference signal, wherein the first transport block transmitted repeatedly is combined and decoded by the base station, wherein a first transmission point of the second transport block is confirmed by the base station based on the second reference signal, and wherein the second transport block is decoded by the base station without being combined with the first transport block.

4. The method of claim 1, wherein the first transport block is no longer transmitted or is transmitted simultaneously with the second transport block when the second transport block is transmitted.

5. The method of claim 1, further comprising receiving, by the terminal, allocation information on the first reference signal and allocation information on the second reference signal from the base station, wherein the allocation information on the first reference signal and the allocation information on the second reference signal are received through radio resource control (RRC) signaling.

6. The method of claim 1, further comprising receiving, by the terminal, allocation information on a second grant-free uplink resource which is scheduled semi-statically from the base station, wherein allocation information on the first grant-free uplink resource and allocation information on the second grant-free uplink resource are received through RRC signaling, wherein the first grant-free uplink resource and the second grant-free uplink resource are frequency hopped, wherein a start point of a period of the first grant-free uplink resource and a start point of a period of the second grant-free uplink resource are different from each other, and wherein the second transport block is transmitted through the second grant-free uplink resource based on the second reference signal.

7. The method of claim 1, further comprising additionally transmitting, by the terminal, a scheduling request or a preamble when the second transport block is transmitted, wherein the second transport block is distinct from the first transport block through the scheduling request or the preamble.

8. The method of claim 7, further comprising:

receiving, by the terminal, allocation information on the first reference signal and allocation information on the second reference signal from the base station; or randomly selecting, by the terminal, the first reference signal and the second reference signal.

9. The method of claim 7, further comprising:

receiving, by the terminal, an uplink grant from the base station when decoding of the first transport block fails; and retransmitting, by the terminal, the first transport block based on the uplink grant, wherein the first transport block is no longer transmitted through the first grant-free uplink resource when the second transport block is transmitted or the uplink grant is received.

10. The method of claim 7, further comprising receiving, by the terminal, allocation information on a second grant-free uplink resource which is scheduled semi-statically from the base station, wherein the second transport block is transmitted through the second grant-free uplink resource based on the second reference signal, and wherein the first grant-free uplink resource and the second grant-free uplink resource are allocated to different subframes.

11. A terminal for transmitting an uplink transport block in a wireless communication system, the terminal comprising:

a radio frequency (RF) unit that transmits or receives a radio signal; and a processor controlling the RF unit, wherein the processor is configured to:

receive allocation information on a first grant-free uplink resource which is scheduled semi-statically from a base station;

repeatedly transmit, by the terminal, a first transport block through the first grant-free uplink resource based on a first reference signal; and transmit, by the terminal, a second transport block based on a second reference signal before the transmission of the first transport block is complete, wherein the second transport block is distinct from the first transport block based on a change of the first reference signal to the second reference signal.

12. The terminal of claim 11, wherein the second transport block is transmitted through the first grant-free uplink resource, and wherein a sequence of the second reference signal is different from a sequence of the first reference signal.

13. The terminal of claim 11, wherein a first transmission point of the first transport block is confirmed by the base station based on the first reference signal, wherein the first transport block transmitted repeatedly is combined and decoded by the base station, wherein a first transmission point of the second transport block is confirmed by the base station based on the second reference signal, and wherein the second transport block is decoded by the base station without being combined with the first transport block.

14. The terminal of claim 11, wherein the first transport block is no longer transmitted or is transmitted simultaneously with the second transport block when the second transport block is transmitted.

15. The terminal of claim 11, wherein the processor receives allocation information on the first reference signal and allocation information on the second reference signal from the base station, wherein the allocation information on the first reference signal and the allocation information on the second reference signal are received through radio resource control (RRC) signaling.

16. The terminal of claim 11,
wherein the processor receives allocation information on a second grant-free uplink resource which is scheduled semi-statically from the base station,
wherein allocation information on the first grant-free uplink resource and allocation information on the second grant-free uplink resource are received through RRC signaling,
wherein the first grant-free uplink resource and the second grant-free uplink resource are frequency hopped,
wherein a start point of a period of the first grant-free uplink resource and a start point of a period of the second grant-free uplink resource are different from each other, and
wherein the second transport block is transmitted through the second grant-free uplink resource based on the second reference signal.

17. The terminal of claim 11,
wherein the processor additionally transmits a scheduling request or a preamble when the second transport block is transmitted,
wherein the second transport block is distinct from the first transport block through the scheduling request or the preamble.

18. The terminal of claim 17,
wherein the processor receives allocation information on the first reference signal and allocation information on the second reference signal from the base station; or
wherein the processor randomly selects the first reference signal and the second reference signal.

19. The terminal of claim 17,
wherein the processor receives an uplink grant from the base station when decoding of the first transport block fails, and
wherein the processor retransmits the first transport block based on the uplink grant,
wherein the first transport block is no longer transmitted through the first grant-free uplink resource when the second transport block is transmitted or the uplink grant is received.

20. The terminal of claim 17,
wherein the processor receives allocation information on a second grant-free uplink resource which is scheduled semi-statically from the base station,
wherein the second transport block is transmitted through the second grant-free uplink resource based on the second reference signal, and
wherein the first grant-free uplink resource and the second grant-free uplink resource are allocated to different subframes.

* * * * *